Patented Apr. 9, 1940

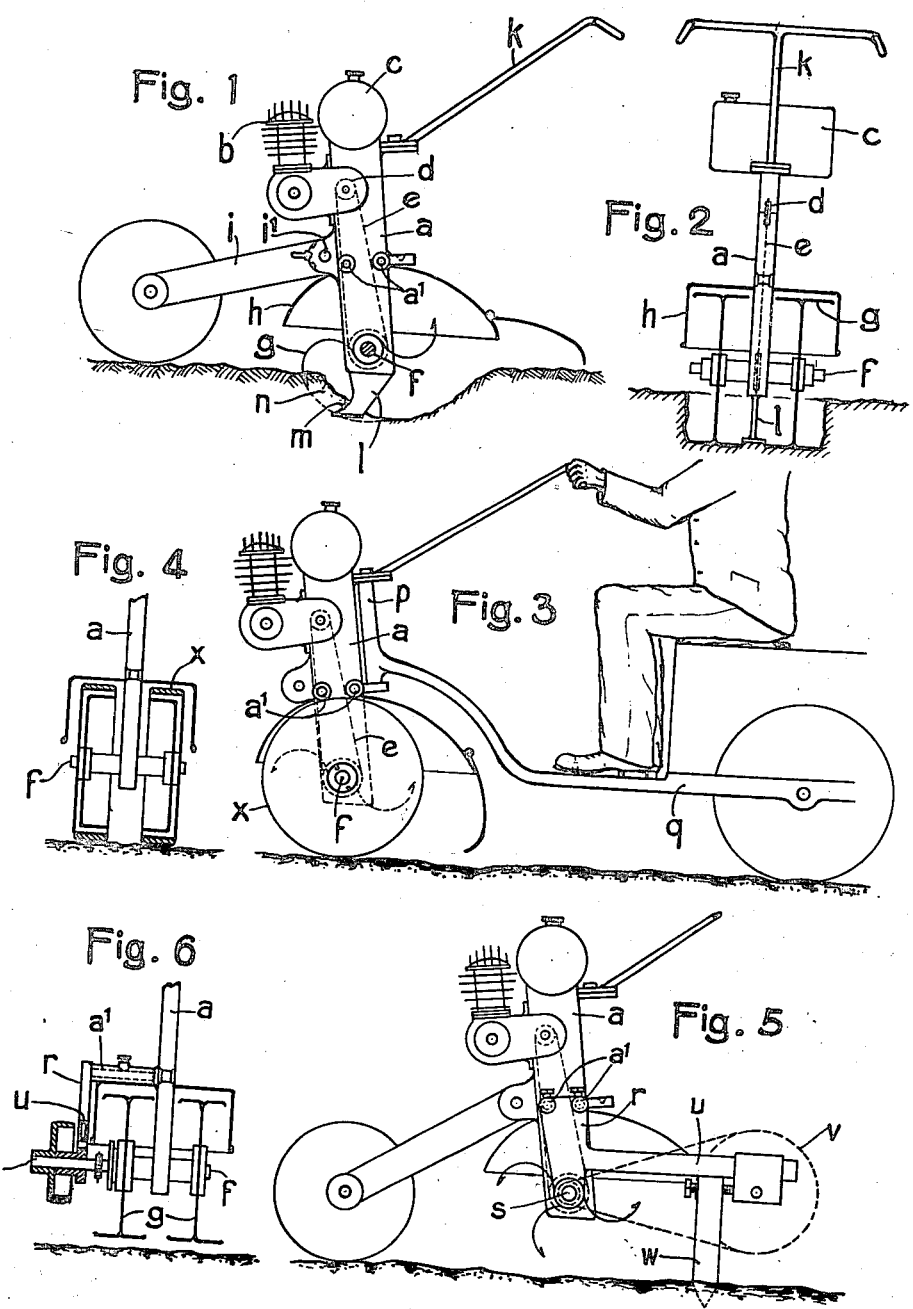

2,196,347

UNITED STATES PATENT OFFICE 2,196,347

MOTOR DRIVEN ROTARY TILLER

Konrad von Meyenburg, Basel, Switzerland, assignor to the firm of "Motorkultur Aktiengesellschaft," Basel, Switzerland Application October 8, 1937, Serial No. 168,070
In Germany October 14, 1936

14 Claims. (Cl. 97—40)

The present invention relates to a power driven implement for breaking up soil especially useful for agricultural purposes. The invention is particularly directed to a motor driven rotary tiller which carries its own power and is not provided with driving wheels.

As a general rule in power driven rotary tillers the tilling tools will exert a forwardly directed pressure due to the reactions arising during operation. When a positive forward feed is dispensed with as in the present invention then the forward thrust of the machine must be secured either from the tilling tools alone or from the tilling tools in conjunction with the pulling or pushing by the driver or by an animal or by motor traction. It is desirable that the tools alone should exert a sufficient forward thrust. In order to secure this it is essential that a relatively large weight should act upon the tool system.

It is an object therefore of the present invention to position the power plant for the machine so closely in front of the vertical transverse plane in which the tool axis lies so that the main portion of the entire weight of the machine will rest upon the tool system. In this manner the forward travel or thrust of the machine may be secured due solely to the tool operation.

A further object of the machine is to so position the main weight of the machine with respect to the tilling tool so that such weight will counteract the tendency of the machine to lift itself from the ground.

A further object of the machine is to provide positive means which will counteract the lifting tendency of the machine.

With the above and other objects in view which will become apparent below the invention comprises the combination and arrangement of parts hereinafter set forth in detail and shown in the drawing in which:

Figure 1 shows a side view of the tiller in operation.

Figure 2 is an end view of the tiller in operation.

Figure 3 is a side view of a modified construction with the earth penetrating tine removed.

Figure 4 is a partial cross sectional view through the road wheels shown in Figure 3 as positioned on the tool shaft.

Figure 5 shows a side view of the machine provided with a power take-off frame body with the earth penetrating tine removed, and Figure 6 is a partial cross sectional view with portions shown in elevation of the power take-off mechanism illustrated in Figure 5.

Referring to the drawing in which similar reference characters are used for like parts it will be noted that this machine comprises a holder $a$ to which the various elements hereinafter described are attached and that the major portion of the weight of the machine is concentrated so as to act upon a tool shaft $f$ (see Figure 1). On the shaft $f$ are positioned the tilling tools $g$. The holder $a$ supports the shaft $f$ and also encloses the driving means $e$ for said shaft. In order to secure a compact, strong, simple, light and cheap construction the holder $a$ is so constructed as to serve as a compact holder for the various essential members of the machine. Therefore the following parts are attached to the holder $a$. At the top front of the holder $a$ the motor $b$ is positioned. Also the feeler member $i$ is secured to the holder $a$. At approximately the center of the holder $a$ the tilling tool cover $h$ is secured and below the cover is positioned the tool shaft $f$ with the tilling tools $g$. Also secured to the holder $a$ is the earth penetrating tine $l$ and extending towards the rear is the steering arm $k$. Directly above the holder $a$ and secured thereto is the fuel tank $c$.

In Figure 3 an adaptation of the machine is shown in which a trailer $g'$ is coupled to the holder $a$ by the hinge device $p$.

In Figures 5 and 6 a further adaptation of the machine is shown in which a frame body $r$ for a power take-off is releasably connected to the side of the holder $a$.

To adjust the depth of the cut made by the tilling tools the feeler member $i$ is made adjustable in height with relation to the rest of the machine. In order to secure this result the feeler member $i$ is made adjustable in height with relation to the rest of the machine. The feeler member $i$ is pivoted to a pivot $i^1$ (see Figure 1) mounted upon the holder $a$ and combined with adjusting and removing means. By this construction it is possible to adjust the depth of the cut without securing any undesirable tilting of the machine.

In order to prevent and counteract the tendency of the machine during the operation of the tilling tools to lift itself away from the ground there is provided an earth penetrating tine $l$ which is located at the bottom of the holder $a$ and which is provided with an inclined broad cutting face $m$ sloping down forwardly. The forward edge of the cutting face $m$ cuts in front of the cutting curve $n$ of the tilling tools. In this manner the resistance of the solid earth against the tine $l$ tends to prevent lifting of the machine.

The tine $l$ is also constructed so that it may regulate the forward feed of the machine. Due to the horizontal reaction caused by the tilling tools the machine and the tine $l$ is pushed forwardly with the tine penetrating into uncut solid ground. As is obvious the tine $l$ will meet with less resistance in the softer ground and will meet with more resistance in the harder ground. Therefore the tine $l$ will move further into the softer ground and less into the harder ground. This will regulate the extent of the earth which is pressed to the cut of the tilling tools following. The tine $l$ therefore to a very great extent determines the forward speed of the machine in accordance with the earth resistance.

In order to facilitate the travel of the machine on roads the road wheels $x$ are provided of larger diameter than the tool system mounted upon the shaft. These are shown in Figures 3 and 4 and may be driven by the power plant so as to move the machine forwardly at any speed desired by the operator. The road wheels $x$ need not of course be connected with the power plant and in such case as shown the machine is pushed by the operator.

In order that the operator may be transported in a speedy manner together with small loads a trailer $q$ may be hinged to the holder $a$ by the hinge $p$ as shown in Figure 3.

In the present invention a single axle is provided for the trailer and a single axle is provided for the machine. Furthermore the tiller which pulls the trailer is relatively narrow tracked. Therefore the hinge $p$ must permit a lateral swinging of the tiller only in a substantially horizontal plane.

In Figure 5 a frame body $r$ for power takeoff is attached to the holder $a$ at the point $a^1$. In order to save the tool shaft $f$ from heavy radial loads the shaft $f$ is coaxially coupled with an auxiliary shaft $s$ carried in the frame body $r$ so that radial forces are transmitted from the shaft $s$ to the frame body $r$ and thence to the holder $a$.

If a speed reduction is desired as for example in winding or in the driving of auxiliary driving wheels then the reduction gear wheels $v$ may be mounted by means of a bearing arm $u$ on the frame body $r$ and driven in the same direction as the tool shaft $f$ but at reduced speed. As shown in Figure 5 the bearing arm $u$ may be provided with a supporting leg $w$ for supporting the rear of the machine.

Due to the location of the weight in the machine described an efficient loading of the reducing gear wheels $v$ is secured which is desirable in plow cable winding and heavy traction surface.

What I claim is:

1. In a rotary tiller, the combination of a central arm-like holder, a rotary tool-shaft borne at the lower end of said holder, rotating tilling tools mounted upon said shaft, a driving-motor carried outside on that holder, all in such a position that the weight-center of the whole is located so far in front of said tool-shaft that during the working process, owing to rearing reaction, the main part of downward adhesion pressure of the tiller is concentrated on the tilling tools, said tilling tools being adapted, owing to said weight positioning, to automatically move the tiller forwardly while cutting, driving means interconnecting said driving motor and said tool shaft, a ground engaging member supported by said holder, and a steering arm attached to said holder.

2. In a rotary tiller as set forth in claim 1, means on said holder for adjusting the height of said engaging member.

3. In a rotary tiller as set forth in claim 1, an earth penetrating tine placed so that its edge enters yet uncut earth in front of the tilling tools and thereby holds the tiller down and regulates its forward feed.

4. In a rotary tiller as set forth in claim 1, an earth penetrating tine secured to the lower end of said holder beneath said tool shaft and having a downwardly sloping wide face with a cutting edge positioned in advance of the tilling curve described by the ends of said tilling tools so as to penetrate beneath a strip of solid not yet tilled ground, for the purposes described.

5. In a rotary tiller as set forth in claim 1, road wheels adapted to be mounted on said tool shaft for running on road, said wheels being of larger diameter than the tool system.

6. In a rotary tiller as set forth in claim 1, a detachable frame body for taking off power, mounted on said holder.

7. In a rotary tiller as set forth in claim 1, a detachable frame body mounted on said holder, an auxiliary shaft borne in said frame body coaxially with said tool shaft, means coupling said shafts, a low speed shaft borne by said frame body, and means for driving said low speed shaft from second shaft at reduced speed.

8. In a rotary tiller the combination of a central arm-like holder, a rotary tool-shaft mounted at the lower end of said holder, tilling tools mounted upon said shaft, a driving motor carried on said holder in such a position that the weight center of the above parts is located in front of the vertical plane containing the axis of said shaft, a driving connection between said motor and said shaft and an earth penetrating tine placed so that its edge enters uncut earth in front of the tilling tools and thereby holds the tiller down and regulates its forward feed.

9. In a rotary tiller the combination of a central arm-like holder, a rotary tool-shaft mounted at the lower end of said holder, tilling tools mounted upon said shaft, a driving motor carried on said holder in such a position that the weight center of the above parts is located in front of the vertical plane containing the axis of said shaft, a driving connection between said motor and said shaft and an earth penetrating tine secured to the lower end of said holder beneath said tool-shaft and having a downwardly sloping face with a cutting edge positioned in advance of the tilling curve described by the ends of said tilling tools so as to penetrate beneath a strip of solid not yet tilled ground.

10. In a rotary tiller the combination of a central arm-like holder, a rotary tool-shaft mounted at the lower end of said holder, tilling tools mounted upon said shaft, a driving motor carried on said holder in such a position that the weight center of the above parts is located in front of the vertical plane containing the axis of said shaft, a driving connection between said motor and said shaft and road wheels adapted to be mounted on said tool-shaft, said wheels being able to be driven by said motor.

11. In a rotary tiller the combination of a central arm-like holder, a rotary tool-shaft mounted at the lower end of said holder, tilling tools mounted upon said shaft, a driving motor carried on said holder in such a position that the weight center of the above parts is located in front of the vertical plane containing the axis of said shaft, a driving connection between said motor and said shaft and road wheels adapted to be mounted on said tool-shaft, said wheels being of larger diameter than the tool system.

12. In a rotary tiller the combination of a central arm-like holder, a rotary tool-shaft mounted at the lower end of said holder, tilling tools mounted upon said shaft, a driving motor carried on said holder in such a position that the weight center of the above part is located in front of the vertical plane containing the axis of said shaft, a driving connection between said motor and said shaft and a detachable frame body for taking off power, mounted on said holder.

13. In a rotary tiller the combination of a central arm-like holder, a rotary tool-shaft mounted at the lower end of said holder, tilling tools mounted upon said shaft, a driving motor carried on said holder in such a position that the weight center of the above parts is located in front of the vertical plane containing the axis of said shaft, a driving connection between said motor and said shaft and a detachable frame body mounted on said holder, an auxiliary shaft borne in said frame body coaxially with said tool-shaft, means coupling said shafts, a low speed shaft borne by said frame body, and means for driving said low speed shaft from said second shaft at reduced speed.

14. In a rotary tiller the combination of a central arm-like holder, a rotary tool-shaft mounted at the lower end of said holder, tilling tools mounted upon said shaft, a driving motor carried on said holder in such a position that the weight center of the above parts is located in front of the vertical plane containing the axis of said shaft, a driving connection between said motor and said shaft, an earth penetrating tine placed so that its edge enters uncut earth in front of the tilling tools and thereby holds the tiller down and regulates its forward feed and means for adjusting the depth of cut of said tilling tools.

KONRAD von MEYENBURG.